(12) United States Patent
Rimal et al.

(10) Patent No.: US 11,073,232 B2
(45) Date of Patent: Jul. 27, 2021

(54) MULTILAYERED PIPE AND METHOD OF MANUFACTURING THE SAME

(71) Applicant: Wavin B.V., CW Zwolle (NL)

(72) Inventors: Martin Rimal, Melnik (CZ); David Krbec, Tisice (CZ)

(73) Assignee: Wavin B.V., Zwolle (NL)

( * ) Notice: Subject to any disclaimer, the term of this patent is extended or adjusted under 35 U.S.C. 154(b) by 0 days.

(21) Appl. No.: 15/744,143

(22) PCT Filed: Jul. 6, 2016

(86) PCT No.: PCT/EP2016/065960
§ 371 (c)(1),
(2) Date: Jan. 12, 2018

(87) PCT Pub. No.: WO2017/009131
PCT Pub. Date: Jan. 19, 2017

(65) Prior Publication Data
US 2018/0202583 A1    Jul. 19, 2018

(30) Foreign Application Priority Data

Jul. 14, 2015   (NL) ..................... 1041400

(51) Int. Cl.
*F16L 11/00* (2006.01)
*F16L 9/12* (2006.01)
(Continued)

(52) U.S. Cl.
CPC ................ *F16L 9/123* (2013.01); *B32B 1/08* (2013.01); *B32B 7/12* (2013.01); *B32B 27/08* (2013.01);
(Continued)

(58) Field of Classification Search
CPC ........................................ F16L 9/123
(Continued)

(56) References Cited

U.S. PATENT DOCUMENTS 4,077,921 A * 3/1978 Sharpe .................. C08G 18/10
427/427
5,016,675 A * 5/1991 Igarashi ............. B60H 1/00571
138/125
(Continued)

FOREIGN PATENT DOCUMENTS

CN        101418886 A      4/2009
CN        101678632 A      3/2010
(Continued)

OTHER PUBLICATIONS

International Search Report and Written Opinion for International Application No. PCT/EP2016/065960, dated Aug. 2, 2016.
(Continued)

*Primary Examiner* — James F Hook
(74) *Attorney, Agent, or Firm* — Wolf, Greenfield & Sacks, P.C.

(57) ABSTRACT

The present invention concerns a multilayered pipe comprising an inner basis layer (1) and an outer layer (2), the inner basis layer (1) and the outer layer (2) comprising polypropylene, and with a reinforcement layer (3, 6) reinforced with mineral fibers and located between the inner basis layer (1) and the outer layer (2), wherein at least one layer of the pipe located between the inner basis layer (1) and the outer layer (2) is a barrier layer (3) comprising polyamide.

27 Claims, 3 Drawing Sheets

(51) Int. Cl.
  *B32B 1/08* (2006.01)
  *B32B 7/12* (2006.01)
  *B32B 27/08* (2006.01)
  *B32B 27/20* (2006.01)
  *B32B 27/32* (2006.01)
  *B32B 27/34* (2006.01)

(52) U.S. Cl.
  CPC .............. *B32B 27/20* (2013.01); *B32B 27/32* (2013.01); *B32B 27/34* (2013.01); *B32B 2250/03* (2013.01); *B32B 2250/04* (2013.01); *B32B 2250/05* (2013.01); *B32B 2250/24* (2013.01); *B32B 2262/10* (2013.01); *B32B 2597/00* (2013.01)

(58) Field of Classification Search
  USPC .................................................. 138/125, 137
  See application file for complete search history.

(56) References Cited

U.S. PATENT DOCUMENTS

| | | | |
|---|---|---|---|
| 5,512,342 A | 4/1996 | Röber et al. | |
| 5,957,164 A * | 9/1999 | Campbell | B60H 1/00571 138/126 |
| 6,179,008 B1 * | 1/2001 | Kawazura | B32B 7/12 138/125 |
| 6,216,744 B1 * | 4/2001 | Leray | F16L 9/12 138/125 |
| 7,281,547 B2 * | 10/2007 | Cleveland | B32B 1/08 138/137 |
| 2001/0001395 A1 * | 5/2001 | Shifman | B32B 1/08 138/126 |
| 2005/0170118 A1 * | 8/2005 | Cleveland | B32B 1/08 428/36.91 |
| 2006/0011251 A1 * | 1/2006 | Sato | B32B 1/08 138/137 |
| 2006/0083884 A1 * | 4/2006 | Cheng | B32B 1/08 428/36.91 |
| 2006/0124191 A1 | 6/2006 | Bowman | |
| 2008/0006338 A1 * | 1/2008 | Wideman | F16L 11/081 138/126 |
| 2010/0071796 A1 * | 3/2010 | Ek | B32B 1/08 138/140 |
| 2010/0126617 A1 * | 5/2010 | Stroempl | F16L 11/125 138/137 |
| 2010/0218839 A1 * | 9/2010 | Conley | B32B 1/08 138/130 |
| 2011/0000572 A1 * | 1/2011 | Ramaswamy | B32B 1/08 138/149 |
| 2011/0155359 A1 | 6/2011 | Doshi | |
| 2011/0186170 A1 * | 8/2011 | Oishi | F16L 9/14 138/140 |
| 2011/0226375 A1 * | 9/2011 | Harris | B32B 1/08 138/137 |
| 2012/0021157 A1 * | 1/2012 | Kawai | B60H 1/00571 428/36.91 |
| 2012/0155813 A1 * | 6/2012 | Quigley | E21B 17/203 385/101 |
| 2013/0112308 A1 * | 5/2013 | Glejbol | F16L 11/00 138/137 |
| 2013/0273286 A1 * | 10/2013 | Luo | C08L 81/04 428/36.91 |
| 2015/0075666 A1 * | 3/2015 | Clark | B05D 7/50 138/137 |
| 2019/0168479 A1 | 6/2019 | Kremer et al. | |
| 2019/0375180 A1 | 12/2019 | Kremer et al. | |

FOREIGN PATENT DOCUMENTS

| | | |
|---|---|---|
| CN | 102947634 A | 2/2013 |
| CN | 103090126 A | 5/2013 |
| CN | 104093557 A | 10/2014 |
| CN | 104302702 A | 1/2015 |
| CN | 105324239 A | 2/2016 |
| DE | 20 2014 100497 U1 | 2/2014 |
| EP | 0 638 749 A1 | 2/1995 |
| EP | 1 036 967 A1 | 9/2000 |
| EP | 2 851 190 A1 | 3/2015 |
| GB | 2 423 737 A1 | 9/2006 |
| JP | H09-194815 A | 7/1997 |
| JP | 2002-525513 A | 8/2002 |
| JP | 2003-194265 A | 7/2003 |
| JP | 2013-533945 A | 8/2013 |
| JP | 2015-102128 A | 6/2015 |
| UA | 78710 U1 | 3/2013 |
| WO | WO 00/32974 A1 | 6/2000 |
| WO | WO 2005/103139 A1 | 11/2005 |
| WO | WO 2011/016747 A1 | 2/2011 |
| WO | WO 2011/152991 A1 | 12/2011 |
| WO | WO 2013/083255 A1 | 6/2013 |
| WO | WO 2013/154741 A2 | 10/2013 |
| WO | WO 2014/202554 A1 | 12/2014 |
| WO | WO 2015/007636 A1 | 1/2015 |
| WO | WO 2015/160771 A1 | 10/2015 |

OTHER PUBLICATIONS

Office Action for Georgian Application No. 14701/1, dated Feb. 18, 2019.
First Office Action for Chinese Application No. 201680050039.1, dated Apr. 16, 2019.
International Preliminary Report on Patentability for International Application No. PCT/EP2016/065960, dated Jan. 25, 2018.
International Search Report and Written Opinion for International Application No. PCT/EP2017/063306, dated Aug. 23, 2017.
International Preliminary Report on Patentability for International Application No. PCT/EP2017/063306, dated Dec. 13, 2018.
International Search Report and Written Opinion for International Application No. PCT/EP2017/080841, dated Jan. 19, 2018.
Ch. II International Preliminary Report on Patentability for International Application No. PCT/EP2017/080841, dated Jan. 23, 2019.
English Translation of Office Action for Japanese Application No. 2018-521468, dated Jun. 8, 2020.
English Translation of Office Action for Ukrainian Application No. a 2018 01300, dated Sep. 19, 2020.
First Office Action for Chinese Application No. 201780033579.3, dated Jul. 3, 2020.
CN201780033579.3, Jul. 3, 2020, First Office Action.

* cited by examiner

MULTILAYERED PIPE AND METHOD OF MANUFACTURING THE SAME

CROSS-REFERENCE TO RELATED APPLICATIONS

This application is a national stage filing under 35 U.S.C. § 371 of international application PCT/EP2016/065960, filed Jul. 6, 2016, which claims priority to Netherlands application 1041400, filed Jul. 14, 2015, the disclosures of which are incorporated by reference herein in their entireties.

The invention relates to a multilayered pipe as well as to a method of manufacturing the same. In particular, the invention relates to a multilayered pipe to be used for transportation of hot or cold fluids, for example in a heating, a cooling or a water supply system.

Multilayered pipes have widely replaced single layer metal or plastic pipes, which were formerly commonly used in the building industry. By virtue of combining advantageous properties of the different layers such as e.g. special rigidity, resistance against corrosion and/or efficient manufacturability, they may outperform single layered pipes.

EP 2 602 103 A1 discloses a multilayered pipe comprising an inner basis layer and an outer layer comprising polypropylene and a reinforcement layer located between the inner basis layer and the outer layer and reinforced with mineral fibers. The reinforcement layer provides the pipe with strength, structural integrity and temperature resistance.

Independently thereof, multilayered pipes including a barrier layer suited to block the passage of fluids such as air or moisture have been developed. Commonly used barrier layers comprise aluminum or EVOH. Barrier layers can protect a fluid transported in the pipe against other fluids such as from contaminations in the ground diffusing into the pipe.

A pipe with high strength and temperature resistance as well as displaying the additional barrier properties would appear desirable. However, a problem encountered when attempting to manufacture a multilayered pipe displaying both reinforcement as well as barrier properties, e.g. by combining the aforementioned pipe including a reinforcement layer with an additional barrier layer is that the welding properties and the mechanical properties of the pipe deteriorate. For example, the additive in the barrier may mix with polypropylene during welding. Such a mixing tends to reduce the pipe's longevity. Additionally, the addition of a barrier layer may demand thickening the reinforcement layer comprising the mineral fibers, in order to maintain a homogeneously behaving pipe with high temperature resistance and stiffness. However, the thicker pipes with a thicker reinforcement layer have a tendency to be more brittle than the aforementioned pipes without a barrier layer. In view thereof, multilayered pipes displaying both barrier and reinforcement properties may still be improved.

Therefore, the present invention aims at providing a multilayered pipe with good stiffness and durability properties, but which also provide an adequate barrier effect without becoming too brittle.

SUMMARY

The present invention is defined by the independent claims below. Dependent claims are directed to optional features and preferred embodiments.

A multilayered pipe according to the present invention comprises an inner basis layer and an outer layer, the inner basis layer and the outer layer comprising polypropylene. The pipe further comprises a reinforcement layer, reinforced with mineral fibers and located between the inner basis layer and the outer layer. In addition, the pipe also comprises at least one layer located between the inner basis layer and the outer layer which is a barrier layer comprising polyamide. The barrier layer may thereby coincide with the reinforcement layer, or the barrier and the reinforcement layer may be provided as separate layers.

Throughout this disclosure, the term 'polypropylene' is to be interpreted as referring to any type of polypropylene in the broad sense, thus encompassing polypropylene homopolymer, polypropylene random copolymer, polypropylene random copolymer (PPR) e.g. with modified crystallinity, polypropylene block copolymer, and/or comprise one or several materials classified to be of the type 'polypropylene random crystallinity temperature' (PPRCT), or a mixture of any of these variants, as long as this interpretation does not stand in conflict with the particular context of the particular passage of the specification. Additionally, the basis layer and/or the outer layer may be layers comprising material in compliance with EN ISO 15874 or DIN 8077.

The combined presence of a barrier and a reinforcement layer, whether in a combined or in two independent layers, provides both for the required barrier effect, shielding-off a fluid being transported inside of the pipe from the outside, for example from fluids such as air and/or moisture present in the environment surrounding the pipe, as well as stiffness, durability, thermal resistance and high impact strength. The specific combination of a barrier layer comprising polyamide as an additive with a mineral fiber-reinforcement in the pipe allows suppressing the need of increasing the thickness of the layer with the mineral fibers to an extent at which the pipe becomes brittle.

These advantages may be at least partially attributed to the fact that a barrier layer comprising polyamide is more rigid than other barrier layers. A barrier layer comprising polyamide is also more resistant against shrinking effects occurring during welding. The advantages may further be at least partially attributed to the advantage of combining the polyamide barrier layer with a reinforcement layer including mineral fiber. A reason for this is that the mineral fibers can be distributed in their layer densely enough to avoid an overall increase of the reinforcement layer thickness, even when a barrier layer is present. Specifically, it turns out that a multilayered pipe may become too brittle if the thickness of the reinforcement layer is increased, independently of the density of fibers present in the layer. In other words, the brittleness of the pipe due to an increase of thickness of the reinforcement layer cannot be remedied by concurrently lowering the density of the fibers in the layer. The present invention overcomes this hurdle by selecting a specific combination of reinforcement and barrier layer, i.e. by selecting a mineral fiber-reinforcement layer and a polyamide barrier layer.

Thus, the multilayered pipe according to the present invention combines the advantageous barrier properties with desirable stiffness and longevity of the pipe. As an advantageous by-product, the pipe is nevertheless weldable using a known welding process such as polyfusion welding, without the necessity of peeling-off of an outer part of the pipe near a welding region before performing the welding step(s).

Specifically, the multilayered pipe according to the present invention is also less prone to quality deteriorations in the proximity of a welding portion than known pipes comprising a barrier layer.

The presence of the mineral fibers in at least one reinforced layer generally reduces the barrier layer's affinity for thermal expansion and promotes high impact strength. In this way, the barrier layer's resistivity against varying environmental conditions, especially very high, low or varying temperatures, can be further improved not only in welding zones, but in the whole pipe. In addition, the reduction of impact strength allows raising the maximum pressure of fluids transported through the multilayered pipe, yet again offering the possibility of using compact, space-efficiently designed pipes. Hence pipe constructions can be maintained in compact constructional spaces, hence assisting modern and compact space-efficient building technology.

In addition, both the inner basis layer and the outer layer promote the pipe's rigidity and longevity, especially due to the presence of polypropylene. The crystallinity of polypropylene is lower than e.g. that of high-density polyethylene (HDPE) and the (inside and outside) polypropylene-layers are less brittle than a polyethylene layer, thus lowering the risk of cracks forming in the pipe and increasing the pipe's longevity.

It is further advantageous that the outer layer comprising polypropylene promotes rigidity and protects the barrier layer. This implies that the chemical and mechanical properties of the barrier layer are less, or at least less rapidly, affected by environmental conditions.

A PPR/PPRCT outer and/or basis layer may show high crystallinity and therefore provide the pipe with an improved pressure resistance. Concurrently, the PPR/PPRCT-layer is of light weight and therefore allows a reduction of the diameter of a multilayered pipe in relation to the maximally suitable fluid transportation pressure level. PPR/PPRCT-layers can be manufactured and machined cost-efficiently (the manufacturing may e.g. include the use of high extrusion speeds), and therefore their use promotes a reduction of manufacturing costs for the entire pipe. In addition, the basis layer and/or the outer layer show low levels of brittleness. A reason for this can lie in the presence of high levels of beta-nucleated crystals enabling excellent slow crack growth properties or due to a different molecular structure of the copolymer itself.

Preferably, the polyamide contained in the barrier layer is a low-melting polyamide. The polyamide may be selected from a group consisting of polycaprolactam (PA6), its copolymer, PA 66 and PA 66 copolymer. However, the barrier layer may also comprise any combination of these materials. In addition, the invention encompasses embodiments wherein the barrier layer consists of any one or a combination of these polyamides.

PA6, PA6 copolymer, PA66 or PA66 copolymer provide a particularly high stiffness to the barrier layer and further improve overall pipe stiffness. They also display outstanding absorption properties, so that they can shield off high amounts of any fluid (e.g. moisture) from leaking through either from the inside of the pipe to the surrounding, or vice versa. PA6 is currently considered most preferably, as it offers an outstanding compromise in terms of its properties and material costs.

Preferably, the mineral fibers in the reinforcement layer are selected from a group consisting of basalt fibers, carbon fibers and glass fibers (such as E-glass fibers) or any combination thereof. Other mineral fibers with tensile strengths within a range of 3 to 5.5 GPa, preferably 3.5-4.9 GPa may be alternatively or additionally used to reinforce the reinforcement layer. Similarly, alternative or additional fibers with an elastic modulus between 75 and 240 GPA are preferably used, and a fiber density of 1.75 to 2.75 g/cm$^3$ is preferable, as such a density yields a suitable weight density of the entire pipe, assisting an easy on-site workability of the pipes, e.g. when welding pipes together on a construction site, or when exchanging pipe e.g. during renovation works.

It is preferable when the reinforcement layer comprises mineral fibers with a weight content of 10-15 wt % with respect to the weight of the reinforcement layer. It is even more preferable, when the weight content amounts to 11-15 wt %, and 11-13 wt % is most preferable. These weight content ranges maximize the above-mentioned beneficial effects of the reinforcement layer.

It is also preferable when the thickness of the reinforcement layer lies within a range of 25-40% of the total thickness of the pipe. A higher thickness may lead to undesired levels of brittleness of the pipe, while lowered thicknesses may deteriorate the thermal expansion properties of the pipe. A thickness range of 30-35%, and especially of 31-34%, is considered even more preferable. These mentioned ranges provide, in an increasing manner from general to more preferable range, an outstanding compromise between resistance against brittleness and promoting good thermal expansion properties.

When the mineral fibers are basalt fibers, the volume of the fibers preferably amounts to 4-6%, and even more preferably to 4.5-5.5%, of the total volume of the pipe. Likewise, when the mineral fibers are glass fibers, the volume of the fibers preferably amounts to 6-8%, and even more preferably to 6.5-7.5% of the total volume of the pipe. These ranges have been found to be especially useful in order to avoid the need to thicken the pipe. Thus, brittleness of the pipe can be reduced, while a high stiffness, temperature resistance and impact strength is ensured.

It is further preferable for the mineral fibers to have a diameter of 7-20 microns, more preferably of 10-13 microns. Additionally or independently therefrom, the mineral fibers preferably have a mean length of 100-3000 microns, preferably 400-2000 microns. These diameter ranges and lengths especially promote good weldability properties of the pipe without compromising the integrity of the barrier layer, especially in the proximity of the welding zone. In addition, the effects of the barrier layer and of the reinforcement of at least one layer nicely complement each other. These complementary effects are stronger when using the mineral fibers with preferable diameters and lengths as opposed to using e.g. shorter fibers, due to the adaption of the fiber lengths and diameters to the properties of polyamide as used in the barrier layer to promote the shielding effect.

According to a preferred embodiment of the present invention, the at least one reinforcement layer is the barrier layer, i.e. the reinforcing mineral fibers are provided in the barrier layer. This leads to an advantageous composite compound concept, as the compound material comprising polyamide and mineral fibers (e.g. basalt fibers) may mix the compounds According to another preferred embodiment, the at least one reinforcement layer is located between the inner basis layer and the barrier layer or between the outer layer and the barrier layer. These configurations are advantageous, as it is especially cost-efficient and easy to implement the barrier layer and the reinforcement layer separately, and the interaction between the compensatory effects of the barrier and of the reinforcement layer nevertheless remains strong, when the reinforcement layer is provided in the proximity of (and possibly even adjacent to) the barrier layer. The embodiment comprising the barrier layer located radially inside of the reinforcement layer is further advantageous, as the reinforcement layer additionally protects the barrier layer, so that the chance of polyamide mixing with polypropylene is additionally lowered.

The present invention also encompasses embodiments, wherein one or even two additional layers (located radially inside or outside of the barrier layer), aside from the reinforced layer discussed above, are reinforced/reinforcement layers.

Preferably, the reinforcement layer comprises polypropylene random copolymer (PPR) and/or one or several materials of the class 'polypropylene random crystallinity temperature' (PPRCT), preferably reinforced with basalt fibers.

The reinforcement layer provides a good resistance against thermal expansion, thus enabling a use of the multilayered pipe under a wide range of temperatures as well as during exposure to (even strongly) varying temperatures, without suffering from degrading effects.

The multilayered pipe may additionally comprise an outer adhesive layer, located between the barrier layer and the outer layer, which is suited to promote an adhesive cohesion between the barrier layer and the outer layer. Alternatively or additionally thereto, the multilayered pipe may comprise an inner adhesive layer located between the base layer and the barrier layer. Thereby, the inner and/or outer adhesive layer is preferably located adjacent to the barrier layer.

Preferably, the inner and/or outer adhesive layer comprises polypropylene copolymer grafted with maleic anhydrite. The respective adhesive layer, especially when grafted with maleic anhydrite, provides an effective adhesion, especially due to the specific interaction between maleic anhydrite and neighboring polypropylene and polyamide.

The barrier layer may further comprise nanofillers, for example wollastonite or montmorillonite. Their weight content is preferably confined to a weight content range of 6 to 17%, even more preferably 8 to 15%, or even 10 to 13%. The weldability is additionally promoted by virtue of the presence of the nanofillers, and their presence additionally also promotes a reduction of the thermal expansion of the pipe and its impact strength.

Also any one of the further layers of the multilayered pipe such as the basis layer or the outer layer (the outermost layer, depending on the total number of layers) may be reinforced with mineral fibers, such as basalt, carbon, and/or glass fibers, and this applies equally to the basis layer, the outer layer, an adhesive or a reinforcing layer. This leads to the promotion of reduced thermal expansion and improved impact strength of these further layers.

Preferably, the inner basis layer and/or the outer layer is made of polypropylene, preferably polypropylene copolymer, PPR or PPRCT. It is especially advantageous if the basis layer comprises any one of the following compounds: polyvinylidene fluoride (PVDF), polyvinylidene chlorate (PVdC), polyphenylene sulfide (PPS) or polyphenylsulfone (PPSF or PPSU). Any one of these compounds or a combination thereof increases the temperature and chemical resistance of the layer and thus of the entire pipe. The basis layer may also consist of any one of PVDF, PVDC, PPS or PPSU (PPSF).

A specific embodiment of the multilayered pipe consists of merely three layers arranged in the following order from inside to outside in a radial direction of the pipe: the inner basis layer, the reinforced barrier layer and the outer layer. Such a pipe is advantageous as it can be manufactured cost-efficiently, as the number of layers to be formed is kept low and as costs for e.g. additional adhesives etc. can be saved. Nevertheless, the three-layered pipe according to the present invention provides a good balance of barrier effects, good weldability, resistance against deteriorating barrier properties in the proximity of welding zones, a small thermal expansion coefficient, rigidity, resistance against crack formation and longevity.

Another preferred embodiment of the pipe consists of four layers arranged in the following order from inside to outside in a radial pipe direction: the inner basis layer, the reinforcement layer, the barrier layer and the outer layer; or the inner basis layer, the barrier layer, the reinforcement layer, and the outer layer. In this way, a cost-efficiently manufacturable pipe is obtained, exhibiting the above-mentioned advantageous effects similar to those of a three-layered pipe, wherein the barrier layer and the reinforcement layer can be separately manufactured.

Also a five-layered pipe is preferable, consisting of five layers arranged in the following order from inside to outside in the radial pipe direction: inner basis layer, inner adhesive layer, reinforced barrier layer, outer adhesive layer, and outer layer. This pipe exhibits excellent stiffness, barrier properties, thermal expansion properties and crack resistance properties, while ensuring a very strong cohesive structure of the pipe, thus further promoting longevity of the pipe.

Another preferred embodiment of the present invention consists of a six-layered pipe consisting of six layers arranged in the following order from inside to outside in the radial direction of the pipe: the inner basis layer, the reinforcement layer, the inner adhesive layer, the barrier layer, the outer adhesive layer and the outer layer; or the inner basis layer, the inner adhesive layer, the barrier layer, the outer adhesive layer, the reinforcement layer, and the outer layer.

Six-layered pipes according to the present invention provide a refined balance between barrier effects, reduced thermal expansion, stiffness, crack prevention, easy and cost-efficient manufacturability, resistance against shrinkage effects in molded sections, suitability for use under extreme environmental temperature and/or moisture conditions or strongly varying environmental conditions, wherein the thermal expansion properties are especially effectively reduced, and the barrier properties are strongly enhanced, and the six-layered pipe exhibits remarkably low brittleness.

The multilayered pipe according to the present invention may however, as an addition to any one of the previously discussed embodiments, comprise an additional outside layer comprising or consisting of polyethylene, located radially outside of the inner basis layer. Such an additional outside layer protects the pipe against ultraviolet radiation when being installed outdoors.

Additionally or alternatively thereto, the pipe may also comprise an additional inside inliner layer comprising or consisting of any material selected from the group consisting of PVDF, PPS, PPSU or any combination thereof. This layer further protects the pipe against aggressive chemicals or oxidants such as chlorine dioxide and further improves the pipe's temperature resistance.

The present invention also relates to a method of formation/manufacturing of a multilayered pipe according to any one of the above-mentioned embodiments, configurations or combinations thereof regarding the pipes, wherein said method involves extrusion, injection-molding and/or blow-molding. In this way, the well-balanced multilayered pipes can be formed using convenient techniques, allowing for a wide range of fine tuning of the process parameters depending on the desired characteristics of the multilayered pipe to be formed.

Preferably, the method comprises a step of chemically treating the mineral fibers to adhere to a polymer such as PP and PPR etc. by aminosilane.

Additional advantages and features of the present invention, that can be realized on their own or in combination with one or several features discussed above, insofar as the features do not contradict each other, will become apparent from the following description of preferred embodiments.

The description is given with reference to the accompanying drawings, in which:

DETAILED DESCRIPTION

Figure 1:
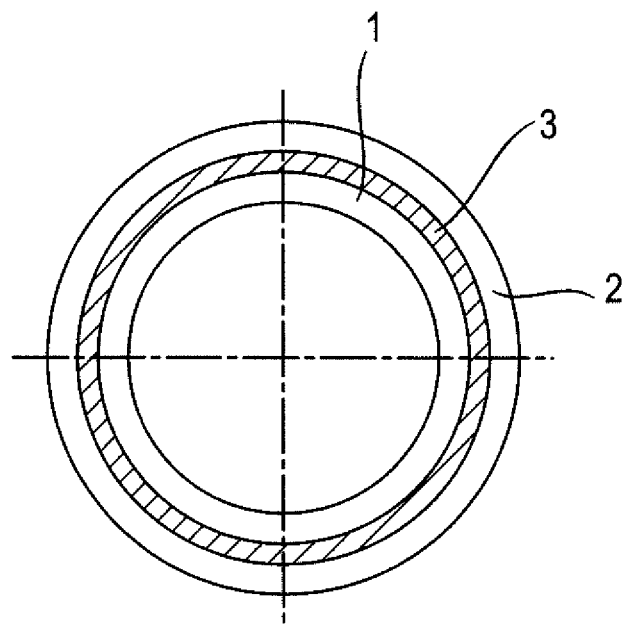
FIG. 1 depicts a three layered-pipe configuration according to an embodiment of the present invention.

FIG. 1 depicts a preferred embodiment of the present invention being a three-layer pipe configuration. The pipe comprises an inner basis layer 1, an outer layer 2, as well as a barrier layer 3, which is also a reinforced layer.

The basis layer 1 and the outer layer 2 both comprise polypropylene random copolymer (PPR). However, variants of these embodiments alternatively or additionally comprise a different polypropylene in the broad sense of the term, such as one or several materials classified to be of the type 'polypropylene random crystallinity temperature' (PPRCT).

The barrier layer 3 comprises polypropylene and the polyamide PA6, and it is reinforced with basalt fibers with a weight content of around 13 wt % with respect to the barrier layer 3. The basalt fibers have a diameter of about 11-12 microns and a mean length of about 1150-12500 microns. The thickness of the barrier layer 3 amounts to about 28% of the total thickness of the pipe, and the total volume of the basalt fibers amounts to about 5% of the total volume of the entire pipe.

The reinforced barrier layer 3 is advantageous over a non-reinforced barrier layer, as it promotes especially high resistance against shrinking effects in a welding portion of the pipe. In particular, the presence of the basalt fibers in the barrier layer 3 compensates for the polyamide's susceptibility to the occurrence of shrinking effects, namely in a welding portion.

As the polyamide and the basalt fibers are mixed in a composite compound layer, the synergetic effect between the two compounds is especially pronounced in this embodiment.

Thus, the pipe depicted in FIG. 1 shows beneficial welding properties, and it provides an effective shielding effect by virtue of the barrier layer 3, the risk of a deterioration of the shielding effect, especially in the proximity of welding zones being severely reduced. In particular, thermal expansion forces which might promote shrinking effects are uniformly distributed across a larger area of the pipe. The pipe's barrier effects can thus be kept intact across the entire zone. Forces promoting shrinking effects are effectively equalized due to the synergetic effect occurring between the polyamide and the basalt fibers in the reinforced barrier layer 3.

The presence of the basalt fibers also reduces the affinity of the barrier layer 3 for thermal expansion in general, and it improves the impact strength of the pipe. In this way, the barrier layer's resistivity against varying environmental conditions, especially very high, low or varying temperatures, can be further improved not only in welding zones, but in the whole pipe. In addition, the reduction of impact strength allows to raise the maximum pressure of fluids transported through the multilayered pipe, yet again offering the possibility of using smaller pipes as opposed to pipes known from the prior art for similar applications involving the same demands regarding maximum pressure. In this way, pipe constructions can be maintained in more compact constructional spaces, hence assisting modern and compact space-efficient building technology.

Figure 2:
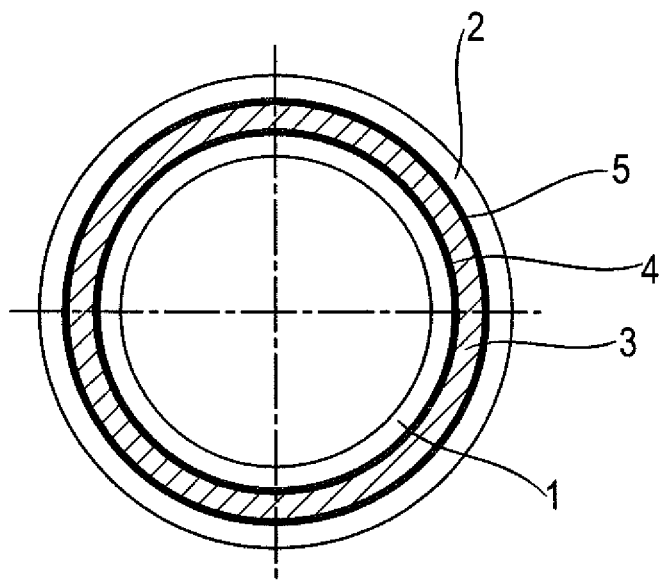
FIG. 2 depicts a five layered-pipe configuration according to an embodiment of the present invention.

Also the embodiment of the present invention depicted in FIG. 2 comprises a reinforced barrier layer 3, comprising polypropylene, PA6 as a polyamide, as well as basalt fibers, present with a weight content of about 13-14 wt %. The thickness of the barrier layer 3 amounts to about 30% of the total thickness of the pipe. The volume of the basalt fibers amounts to about 5% of the total volume of the pipe. The advantageous properties of this pipe are similar to those explained with regard to the previous embodiment, so that not all of the advantages will be explained again. Reference is made to the previous explanations.

Additionally, the embodiment of FIG. 2 comprises an inner adhesive layer 4, located between inner basis layer 1 and the barrier layer 3, as well as an outer adhesive layer 5, located between the barrier layer 3 and the outer layer 2. Both the inner and outer adhesive layers 4, 5 comprise polypropylene copolymer grafted with maleic anhydrite.

The adhesive layers 4, 5 promote a strong adhesive cohesion between the barrier layer 3 and the inner and outer layers 1, 2, respectively.

Also the pipe of FIG. 2 prevents against shrinking effects occurring in a welding portion of the pipe. The basalt fibers in the barrier layer compensate for the barrier layer's susceptibility to shrinking effects. Nevertheless, also the five-layer pipe can be cost-efficiently manufactured, while providing a shielding effect by virtue of the barrier layer 3. Said barrier layer 3 is less prone to display any form of leakage in the proximity of a welding portion of the pipe, due to the reinforcement with the fibers. Hence, forces which might lead to shrinking effects in known pipes are distributed across a larger area (also in the barrier layer 3), keeping the pipe's barrier effects intact across the entire area.

The five-layered pipe of FIG. 2 is especially advantageous, as it exhibits excellent stiffness and barrier properties, thermal expansion properties and crack resistance properties, while ensuring a very strong cohesive structure of the pipe, thus further promoting longevity of the pipe. Such high-quality pipes are especially advantageous for use in high-quality building construction.

Figure 3A:
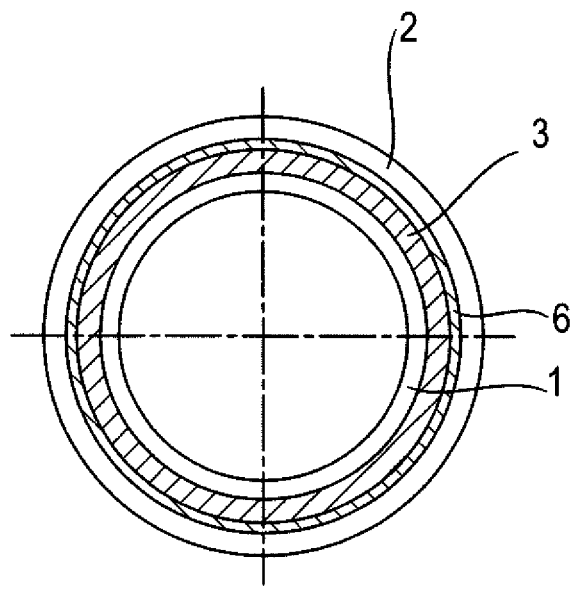
FIG. 3A depicts a four layered-pipe configuration according to an embodiment of the present invention.
Figure 3B:
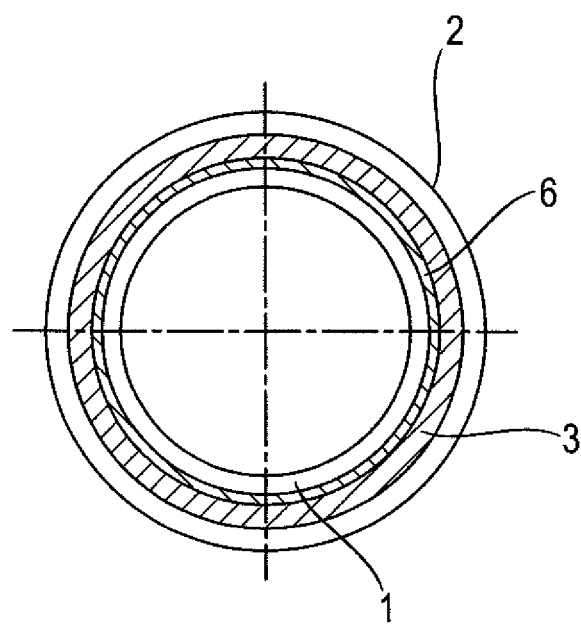
FIG. 3B depicts a four layered-pipe configuration according to an embodiment of the present invention.

FIGS. 3A and 3B of the present application depict embodiments of the present invention consisting of four-layer pipe configurations.

The advantageous properties of the pipes of FIGS. 3A and 3B are similar to those explained with regard to the previous embodiments, so that not all of the advantages will be explained anew and reference is made to the previous explanations.

The pipe depicted in FIG. 3A consists of four layers arranged in the following order from inside to outside in a radial pipe direction: an inner basis layer 1, a reinforcement layer 6, a barrier layer 3, and an outer layer 2.

The inner basis layer 1 and the outer layer 2 are configured analogously as in the case of the embodiments depicted in FIGS. 1 and 2. The barrier layer 3 comprises polypropylene and the polyamide PA6. The reinforcement layer 6 of this embodiment comprises polypropylene and is reinforced with basalt fibers with a weight content of around 10.5 wt %, the basalt fibers having a mean diameter of about 11-12 microns and a mean length of about 1100-1300 microns. The thickness of the barrier layer 3 amounts to about 31% of the total thickness of the pipe. The volume of the basalt fibers amounts to about 5% of the total volume of the pipe.

A difference between the configurations depicted in FIGS. 3A and 3B is that the order of the barrier layer 3 and the reinforcement layer 6 is reversed in the radial direction of the pipe. In other words, the pipe depicted in FIG. 3B consists of four layers arranged in the following order from inside to outside in a radial pipe direction: an inner basis layer 1, a reinforcement layer 6, a barrier layer 3, and an outer layer 2

The configurations of FIGS. 3A and 3B are especially advantageous, as the separate formation of the barrier layer and the reinforcement layer 6 is cost-efficient. Nevertheless, the interaction between the compensatory effects of the barrier layer 3 and of the reinforcement layer 6 is strong.

Figure 4A:
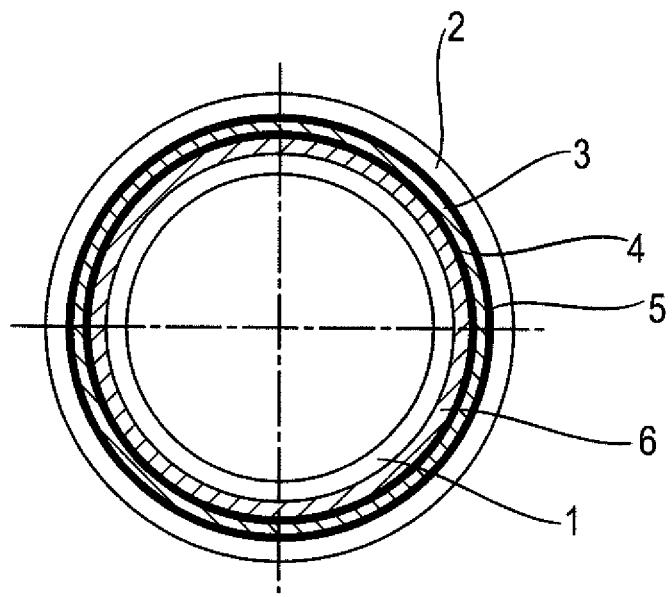
FIG. 4A depicts a six layered-pipe configuration according to an embodiment of the present invention.
Figure 4B:
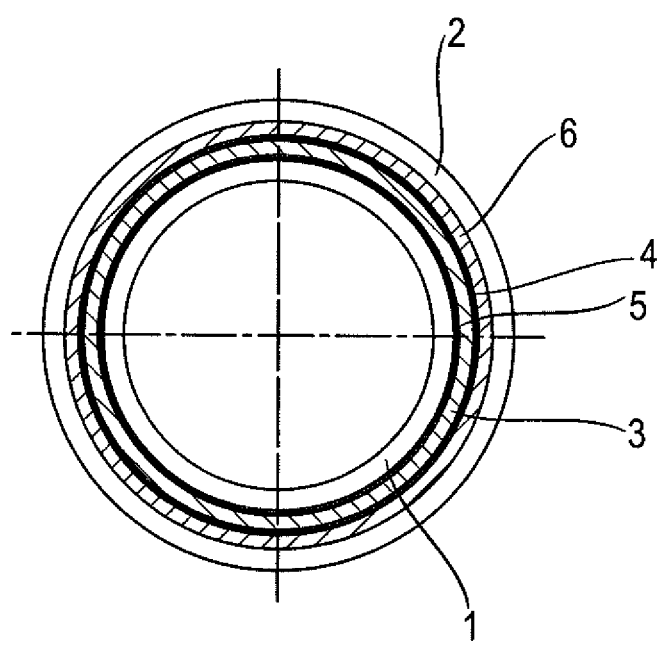
FIG. 4B depicts a six layered-pipe configuration according to an embodiment of the present invention.

FIGS. 4A and 4B of the present application depict embodiments of the present invention consisting of six-layer pipe configurations.

The advantageous properties of the pipes of FIGS. 4A and 4B are similar to those explained with regard to the previous embodiments, so that not all of the advantages will be explained again. Reference is made to the previous explanations.

A difference between the configurations depicted in FIGS. 4A and 4B is that the order of the barrier layer 3 and the reinforcement layer 6 is reversed in the radial direction of the pipe.

The pipe of FIG. 4A consists of six layers arranged in the following order from inside to outside in the radial direction of the pipe: an inner basis layer 1, an inner adhesive layer 4, a barrier layer 3, an outer adhesive layer 5, a reinforcement layer 6, and an outer layer 2.

The pipe of FIG. 4B consists of six layers arranged in the following order from inside to outside in the radial direction of the pipe: an inner basis layer 1, a reinforcement layer 6, an inner adhesive layer 4, a barrier layer 3, an outer adhesive layer 5, and an outer layer 2. This arrangement has the additional advantage that the barrier layer 3 is additionally protected by a radially outer reinforcement layer 6. This further lowers the chance of polyamide getting mixed with polypropylene during welding.

Both in the pipe of FIG. 4A and of 4B, the barrier layer 3 comprises polypropylene and the polyamide PA6. The reinforcement layer 6 of comprises polypropylene and is reinforced with basalt fibers with a weight content of around 12 wt % with respect to the reinforcement layer 6 as a whole, the basalt fibers having a mean diameter of about 11-12 microns and a mean length of about 1100-1300 microns. The thickness of the barrier layer 3 amounts to about 37% of the total thickness of the pipe, and the volume of the basalt fibers amounts to about 5% of the total volume of the pipe.

The pipes depicted in FIGS. 4A and 4B provide a good balance between barrier effects, good weldability without the need to peel off an part of the outer layers, good thermal expansion properties, stiffness, crack prevention, easy and cost-efficient manufacturability, resistance against shrinkage effects in molded sections, suitability to be employed under extreme environmental temperature and/or moisture conditions or strongly varying environmental conditions, wherein the thermal expansion properties are especially effectively reduced, and the barrier properties are strongly enhanced. Additionally, the six-layered pipe exhibits remarkably low brittleness.

The following tests have been carried out. Six layer embodiments were used, wherein the oxygen barrier fulfilled the norm DIN 4726/ISO 21003 (permeability lower than 3.6 mg/m² day). These tests revealed that the pipes according to the present invention display about three times smaller thermal expansion coefficients compared to monolayer pipes known from the prior art. Specifically, thermal longitudinal expansion coefficients using pipes with basalt fiber filler levels of 10% to 30% were measured in a range of about $3 \cdot 10^{-5}$ to $6.5 \cdot 10^{5}$ mm/mm/° C. for temperature ranges between 25° C. and 80° C.

Standard tests for the pressure performances according to the norm 1501167 under 4.3 MPa/95° C. were carried out for six layer pipe embodiments and for three layer basalt fiber filled pipes without a barrier layer. The six layer pipes according to the present invention could sustain pre-defined pressure performances for an about 10% longer period of time, taking the number of hours until failure into account.

In central heating installations, the stiffness and the impact strength of the six layer embodiments were compared with basalt filled pipes without a barrier layer and with six layer basalt filled pipes with an EVOH oxygen barrier layer. The stiffness of the six layer pipes according to the present invention was about 40% higher. The impact strength was increased by about 70% with respect to the basalt filled pipes without a barrier and by about 90% with respect to the six layer basalt filled pipes with an EVOH oxygen barrier.

Moreover, the impact strengths (in Joules) were measured for a six layer pipe according to the present invention including 14% basalt fibers and for a six layer basalt filled pipe with an EVOH barrier using H50 as a test, described in the norm EN1411, performed at 0° C.:

| Thickness (barrier) | PA barrier | EVOH barrier |
|---|---|---|
| 0.00 (without barrier) | 4.9 | 4.9 |
| 0.10 | 7.9 | 4.9 |
| 0.20 | 8.3 | 4.4 |
| 0.30 | 9.3 | 4.4 |
| 0.40 | 10.3 | 4.4 |
| 0.50 | 10.8 | 3.9 |

In addition, their permeabilities (measured in mg/m² day) were measured using a method fulfilling the norm ISO17455:

| Thickness (barrier) | PA barrier | EVOH barrier |
|---|---|---|
| 0.00 (without barrier) | 7.84 | 7.84 |
| 0.10 | 3.32 | 1.15 |
| 0.20 | 1.19 | 0.05 |
| 0.30 | 0.49 | not measured |
| 0.40 | 0.12 | not measured |
| 0.50 | 0.04 | not measured |

Finally, their pressure performance (measured in number of hours until failure; hoop stress 4.3 MPa at 95° C.) was measured using a method fulfilling the norm ISO1167 with an average of 10 samples per pipe:

| Thickness (barrier) | PA barrier | EVOH barrier |
| --- | --- | --- |
| 0.00 (without barrier) | 1441 | 1441 |
| 0.10 | 1554 | 321 |
| 0.20 | 1572 | 84 |
| 0.30 | 1301 | not measured |
| 0.40 | 984 | not measured |
| 0.50 | 522 | not measured |

Each and every one of the embodiments of the pipe according to the present invention depicted in FIGS. 1 to 4B was manufactured using injection-molding, and the basalt fibers were in each case chemically treating by aminosilane in order to promote a good adhesion of the basalt fibers to polypropylene. In the case of the embodiments wherein the barrier layer is a reinforced layer, a good adhesion between the basalt fibers and PA6 can also be realized.

While the embodiments depicted in FIGS. 1 to 4B all comprise basalt fibers for reinforcing the reinforcement layer, it is to be understood that also other mineral fibers such as carbon fibers, glass fibers, or a mixture of these fibers, may be used to reinforce the reinforcement layer in variants of these embodiments. However, glass fibers are preferable, and basalt fibers are especially preferable, due to their specific material properties such as tensile strength, their workability and the costs involved in the manufacturing steps.

While the embodiments of FIGS. 1 to 4B merely comprise basalt fibers as reinforcing fibers, it is to be understood that variations of these embodiments can be realized, additionally comprising nanofillers, for example wollastonite or montmorillonite. The weldability, resistance against shrinkage effects in the proximity of a welding zone and thus prevention of barrier effect deteriorations is further promoted by virtue of the presence of nanofillers, and they also further promote a reduction of the thermal expansion of the pipe and an improvement of its impact strength.

Although the inner basis layer and the outer layer of the embodiments depicted in FIGS. 1-4B comprise PPR, the skilled person will readily conceive variations, wherein any one of the two layer alternatively or additionally comprises: polyvinylidene fluoride (PVDF), polyvinylidene chlorate (PVdC), polyphenylene sulfide (PPS) or polyphenylsulfone (PPSF or PPSU). Any one of these compounds or a combination thereof increases the temperature and chemical resistance of the layer and thus of the entire pipe.

Many additional variations and modifications are possible and are understood to fall within the framework of the invention.

The invention claimed is:

1. Multilayered pipe comprising:
an inner basis layer and an outer layer, the inner basis layer and the outer layer comprising polypropylene, and
a reinforcement layer reinforced with mineral fibers and located between the inner basis layer and the outer layer,
wherein at least one layer of the pipe located between the inner basis layer and the outer layer is a barrier layer comprising polyamide, wherein the mineral fibers have a mean length of 100-3000 microns, and wherein the mineral fibers are basalt fibers.

2. Multilayered pipe according to claim 1, wherein the polyamide in the barrier layer is polycaprolactam (PA6) or its copolymer.

3. Multilayered pipe according to claim 1, wherein the mineral fibers form a weight content of 10-15 wt % of the reinforcement layer.

4. Multilayered pipe according to claim 1, wherein the thickness of the reinforcement layer lies within a range of 25-40% of the total thickness of the pipe.

5. Multilayered pipe according to claim 1, wherein the mineral fibers lies in a range of 4-6% of the volume of the entire pipe.

6. Multilayered pipe according to claim 1, wherein the mineral fibers have a diameter of 7-20 microns.

7. Multilayered pipe according to claim 1, wherein the barrier layer and the reinforcement layer are formed as a single layer.

8. Multilayered pipe according to claim 1, wherein the reinforcement layer is located between the barrier layer and the outer layer or between the inner basis layer and the barrier layer.

9. Multilayered pipe according to claim 1, wherein the reinforcement layer comprises polypropylene.

10. Multilayered pipe according to claim 1, comprising at least one of:
an additional inner adhesive layer, located inside of and adjacent to the barrier layer in a radial direction of the pipe, and
an additional outer adhesive layer, located outside of and adjacent to the barrier layer in a radial direction of the pipe.

11. Multilayered pipe according to claim 1, wherein the inner basis layer and/or the outer layer is made of polypropylene copolymer, PPR or PPRCT.

12. Multilayered pipe according to claim 1, wherein the barrier layer comprises nanofillers, wherein the nanofillers comprise at least one of wollastonite or montmorillonite.

13. Multilayered pipe according to claim 1, comprising an additional outside layer comprising polyethylene and located radially outside of the outer layer.

14. Multilayered pipe according to claim 1, comprising an additional inside inliner layer located radially inside of the inner basis layer and comprising a material selected from the group consisting of PVDF, PPSF, PPSU and any combination thereof.

15. Multilayered pipe according to claim 1, wherein the reinforcement layer and the barrier layer are formed as a single layer, wherein the pipe consists of three layers arranged in the following order from inside to outside in the radial direction of the pipe: the inner basis layer, the single layer and the outer layer.

16. Multilayered pipe according to claim 1,
consisting of four layers arranged in the following order from inside to outside in the radial direction of the pipe: the inner basis layer, the reinforcement layer, the barrier layer and the outer layer; or the inner basis layer, the barrier layer, the reinforcement layer, and the outer layer.

17. Multilayered pipe according to claim 1,
consisting of six layers arranged in the following order from inside to outside in the radial direction of the pipe: the inner basis layer, the reinforcement layer, the inner adhesive layer, the barrier layer, the outer adhesive layer and the outer layer; or the inner basis layer, the inner adhesive layer, the barrier layer, the outer adhesive layer, the reinforcement layer, and the outer layer.

18. Multilayered pipe according to claim 1, the multilayered pipe prepared by one of an extrusion process, an injection-molding process and a blow-molding process.

19. Multilayered pipe according to claim 1, wherein the mineral fibers are aminosilane treated mineral fibers.

20. The multilayered pipe according to claim 1, wherein the mineral fibers have a mean length of 400-2000 microns.

21. A multilayered pipe comprising:
an inner basis layer comprising polypropylene;
an outer layer comprising polypropylene; and
a combined barrier and reinforcement layer located between the inner basis layer and the outer layer, wherein the combined layer is reinforced with mineral fibers and comprises polyamide, wherein the mineral fibers have a mean length of 100-3000 microns, and wherein the mineral fibers are basalt fibers.

22. The multilayered pipe according to claim 21, further comprising at least one of:
an additional inner adhesive layer, located inside of and adjacent to the combined layer in a radial direction of the pipe, and
an additional outer adhesive layer, located outside of and adjacent to the combined layer in a radial direction of the pipe.

23. The multilayered pipe according to claim 21, further comprising an additional outside layer comprising polyethylene and located radially outside of the outer layer.

24. The multilayered pipe according to claim 21, further comprising an additional inside inliner layer located radially inside of the inner basis layer and comprising a material selected from the group consisting of PVDF, PPSF, PPSU and any combination thereof.

25. The multilayered pipe according to claim 21, wherein the thickness of the combined layer lies within a range of 25-40% of the total thickness of the pipe.

26. The multilayered pipe according to claim 21, wherein the volume of the mineral fibers lies in a range of 4-6% of the volume of the entire pipe.

27. The multilayered pipe according to claim 21, wherein the mineral fibers have a mean length of 400-2000 microns.

* * * * *